United States Patent Office 3,657,415
Patented Apr. 18, 1972

3,657,415
CANINE HOOKWORM VACCINES
Francis W. Jennings, William Mulligan, George M. Urquart, William I. Mackay McIntyre, and William F. H. Jarrett, Glasgow, Scotland, assignors to The University Court of the University of Glasgow, Gilmorehill, Glasgow, Scotland
No Drawing. Continuation-in-part of application Ser. No. 675,252, Oct. 13, 1967, which is a continuation of application Ser. No. 402,925, Oct. 9, 1964. This application Aug. 1, 1969, Ser. No. 846,976
Claims priority, application Great Britain, Oct. 10, 1963, 40,085/63
Int. Cl. C12k 5/00, 9/00
U.S. Cl. 424—88                               11 Claims

ABSTRACT OF THE DISCLOSURE

The invention relates to a veterinary vaccine for parenteral administration to animals of the family Canidae. The vaccine comprises a physiologically acceptable aqueous vehicle containing attenuated premigratory live hookworm larvae.

---

This application is a continuation-in-part of Ser. No. 675,252, filed Oct. 13, 1967 now abandoned which is a continuation application of application Ser. No. 402,925, filed Oct. 9, 1964 and now abandoned.

This invention relates to veterinary vaccines and more particularly to vaccines against hookworms.

It has been found that hookworm larvae can be attenuated by ionising radiation, and when administered parenterally to the host animal, the attenuated hookworm larvae will confer a degree of immunity against diseases caused by these parasites.

It is an object of the present invention to provide veterinary vaccines suitable for parenteral administration which confer a degree of immunity against diseases caused by hookworms which are pathogenic to animals of the family Canidae.

Accordingly, the present invention provides an injectable veterinary vaccine suitable for parenteral administration to animals of the family Canidae comprising a physiologically acceptable aqueous vehicle containing premigratory live hookworm larvae of *Ancylostoma caninum* or *Ancylostoma braziliense* artifically attenuated by exposure to ionising radiation to the extent that the larvae are incapable of reproduction.

A preferred vaccine according to the present invention is one in which the dosage of ionising radiation has been such that on sacrifice a dog which has been inoculated with the vaccine is found to contain at least 0.5% and not more than 15% of living but sterile female worms in the intestine.

The attenuation of the premigratory live hookworm larvae can be carried out by exposure to X-rays, to γ-rays, radiation derived from high energy neutron source materials and ionising particles derived from, for example, a linear accelerator or a Van de Graaf generator. The use of X-ray radiation and γ-ray radiation is preferred from a practical standpoint.

The present invention also provides an injectable veterinary vaccine in unit dosage form. Such a vaccine contains the artifically attenuated premigratory live hookworm larvae of *Ancylostoma caninum* or *Ancylostoma braziliense* in an amount of from 125 to 5,000 larvae per millilitre of the physiologically acceptable aqueous vehicle. From the practical point of view, it is preferred to make up the vaccine in a unit dosage form containing from 250 to 5,000 attenuated larvae in from 0.25 to 2 millilitres of the physiologically acceptable aqueous vehicle. The inclusion of a minimum quantity of 250 larvae in each unit dose allows for some deterioration of the vaccine before use.

The invention also provides a method for the production of injectable veterinary vaccine which method comprises adding to a physiologically acceptable aqueous vehicle premigratory live hookworm larvae of *A. caninum* or *A. braziliense* artifically attenuated as described herein in an amount to produce from 250 to 5,000 larvae per millilitre of aqueous vehicle.

The dosage of ionising radiation necessary satisfactorily to attenuate the larvae varies dependent upon other operating conditions but it has been found that in most cases a minimum dosage of 30,000 roentgens is necessary. Basically there are three operating conditions which need to be considered if satisfactory results are to be obtained, these conditions being the actual dosage of radiation, the concentration of larvae in a suspension of larvae in water exposed to the radiation and the temperature of the suspension. It is observed that generally for a given dosage of radiation a less severe attenuation of the larvae is obtained with increasing concentration of larvae and similarly a less severe attenuation is obtained with increasing temperature of the suspension of larvae. It has been found that a satisfactory result is obtained by exposing a suspension of larvae containing an appropriate number of larvae per millilitre of water (e.g. 10,000 to 150,000) at suitable temperatures (e.g. 10 to 30° C.) to a dosage of radiation of 30,000 roentgens or more.

There are three major advantages to be attributed to the present invention.

Firstly, it has been found that the injection of pups with a vaccine according to the present invention confers upon the pups a very substantial immunity against a potentially lethal challenge of immunity.

Secondly, it is found that, in addition to providing substantially immunity, the vaccine according to the present invention ensures that any femal worms which gain the intestine before challenge infection of an immunised animal are sexually sterile and no eggs can be detected in the feces of the animal after vaccination. This, of course, results in a very safe vaccine, the use of which cannot cause dissemination of the infection.

Finally, it is found that the injection of bitches before exposure to environmental infection effectively prevents the colostral infection of pups produced by the bitch. It has been found that examination of pups produced under these conditions shows that most of the worms present in the intestine of the pups are sterile worms and thus a further advantage is produced that dissemination of the parasite and contamination of the environment by the pups is effectively reduced.

The invention will now be illustrated in the following non-limiting examples.

EXAMPLE 1

Feces containing eggs of *Ancylostoma canium* were collected from young dogs infected with the parasite and were cultured for 8 days at 26° C. on moist filter papers placed on sponges in Petri dishes. The larvae had then reached the third or infective stage and were washed from the filter papers, sponges and Petri dishes with water.

The suspension of larvae was then allowed to sediment until the larvae were concentrated in a small volume of water, which was then poured into a Baermann funnel filled with water in which may be dissolved a suitable antimicrobial agent to reduce the possibility of bacterial and other contamination. The larvae were allowed to migrate overnight through a layer of cellulose wadding placed on a wire sieve of 60 meshes to the inch. The suspension of larvae which was drawn from the base of the Baermann funnel was adjusted to contain 10,000 to 50,000 larvae per ml. This suspension was transferred to a plastic Petri dish (e.g. "Perspex"®, I.C.I., England) to a depth of 1 cm. and subjected to irridation of 650 to 720 roentgens per minute in the beam of an X-ray machine operating at 140 kilovolts using external filters consisting of 0.1 mm. of copper and 1.0 mm. of aluminium (half valve layer approximately 8 mm. of aluminium). Irradiation was continued until a measured dose of, for example, 40,000 roentgens, measured at the surface of the suspension, had been delivered. The suspension was then sedimented and the larvae transferred to physiological saline adjusted so that each ml. of saline contained 500 to 1200, for example 1000, larvae. A small quantity of antibiotic and fungi-static agent or agents may be added at this stage to reduce bacterial and fungal growth during storage of the vaccine.

The following experiments illustrate the use and advantages of the vaccine prepared according to the above example.

Experiment 1 (Example 1)

Ten 3 month-old dogs were vaccinated on two occasions separated by one month with a subcutaneous injection of 1,000 *A. caninum* larvae which had been irradiated with 40,000 roentgens. One month after the second vaccination, all of these dogs were given a challenge dose of 1,000 normal *A. caninum* larvae. Five of the dogs received this dose subcutaneously and the other five received it orally. At autopsy 30 days later, an average of 41 worms was found in the first group and 15 in the second.

In a control experiment, three unvaccinated three month-old dogs were given 1,000 normal infective larvae subcutaneously and a further 3 were given 1,000 normal infective larvae by mouth, and the average number of worms found was 544.

The necropsy worm burdens and protection (percent) in the vaccinated pups, as summarised in Table 1, showed that subcutaneous vaccination conferred an equal protection against oral challenge of immunity as it did against subcutaneous challenge of immunity.

TABLE 1

| No. of pups | Treatment—route of administration | | Mean group worm burdens ± standard deviation | Vaccine protection, percent |
|---|---|---|---|---|
| | Vaccination | Challenge | | |
| 3 | Control | Subcutaneous | 549±160 | 0 |
| 5 | Subcutaneous | do | 41±97 | 93 |
| 3 | Control | Oral | 539±133 | 0 |
| 5 | Subcutaneous | do | 15±11 | 97 |

Experiment 2 (Example 1)

Eleven 3 month-old dogs were vaccinated on two occasions at an interval of one month by the subcutaneous administration of 1,000 *A. caninum* larvae irradiated with with 40,000 roentgens. One month after the second vaccination, the dogs were challenged with 1,000 normal *A. caninum* larvae, and of the 11 dogs 6 were given the larvae subcutaneously and the other 5 received it by the oral route. At autopsy 30 days later, an average of 100 worms was found in the first group and an average of 342 worms in the second. By comparison, 6 unvaccinated dogs which received 1,000 normal larvae subcutaneously showed an average of 780 worms and 5 which received 1,000 larvae orally showed an average of 860 worms.

Subcutaneous vaccination was shown (as illustrated in Table 2) to confer a significantly greater degree of protection ($P < 0.05$, Student's "$t$" test) against subcutaneous challenge (88%) than did oral vaccination against oral challenge (60%), and the wide variation of immunity within the group of pups that were orally vaccinated and challenged meant that some of these pups were barely protected while others had a resistance that was almost comparable to subcutaneous test results.

TABLE 2

| No. of pups | Treatment—route of administration | | Mean group worm burdens ± standard deviation | Vaccine protection, percent |
|---|---|---|---|---|
| | Vaccination | Challenge | | |
| 6 | Control | Subcutaneous | 780±96 | 0 |
| 6 | Subcutaneous | do | *97±59 | 88 |
| 5 | Control | Oral | 860±123 | 0 |
| 5 | Oral | do | **336±222 | 60 |

NOTE.—In addition to the listed challenge hookworm burdens, the vaccinated pups were found to harbour *3 and **6 sterile hookworms each.

These experiments (Example 1, Experiments 1 and 2) illustrate that both subcutaneous and oral vaccination confer protection but the former is more effective. This finding of subcutaneous vaccination being superior to oral vaccination is unexpected and previously unreported, being an orginal and novel finding.

Experiment 3 (Example 1)

Six 3 month-old dogs were vaccinated by the subcutaneous administration of 1,000 *A. caninum* larvae X-irradiated with 40,000 roentgens. Twenty-eight days after vaccination, these dogs together with a control group of 12 dogs, similar but unvaccinated, were challenged by the subcutaneous injection of 1,100 normal *A. caninum* larvae. The dogs which survived this challenge were killed 22 days later. At autopsy (Table 3) an average of 86.5 (±8.8) percent of the challenge dose was found as adult hookworms in the control dogs and only 54.2 (±14.9) percent was found in the vaccinated dogs. This shows that the single vaccination conferred a highly significant ($P < 0.01$) resistance to worm establishment in the vaccinated dogs as compared with the controls.

TABLE 3

| No. of pups | Treatment | Mean group worm burdens ± standard deviation | Vaccine protection, percent |
|---|---|---|---|
| 12 | Controls | 952±97 | 0 |
| 6 | Vaccinates | 596±164 | 37 |

Clinically, the vaccinated dogs were not affected adversely by either the vaccine or the challenge dose of larvae. Five of the 12 control dogs died between the twelfth and twenty-second days after challenge as a direct result of blood loss produced by the challenge dose of larvae and the surviving control pups showed all the signs of severe acute ancylostomiasis.

This experiment illustrates that a single subcutaneous inoculation of X-irradiated *A. canium* vaccine confers protection against a potentially lethal challenge of immunity. However, the protection shown against challenge hookworm establishment was somewhat irregular within the group of vaccinates since half of these pups were parasitised by challenge worm burdens which were almost as large as those of the unvaccinated controls.

The results of this experiment also showed, when compared with the result of previous experiments (Tables 1 and 2), that single subcutaneous vaccination with X-irradiated *A. caninum* larvae conferred a less uniform and significantly poorer resistance to challenge infection than did double subcutaneous vaccination with irradiated larvae.

In further experiments, *A. caninum* larvae X-irradiated with 30,000, 40,000 and 60,000 roentgens were administered subcutaneously to 3 month-old dogs. In all cases it was found that the X-irradiation reduced the infectivity of the larvae as measured by subsequent intestinal establishment of adult hookworms. As the dose of radiation was increased, the infectivity of the larvae was decreased and the pathogenicity to the host of the resulting burden of hookworms was reduced. Larvae that had been irradiated with 40,000 and 60,000 roentgens appeared to be virtually non-pathogenic since after inoculation of these larvae to pups their hematologic values were unchanged. At levels of radiation of 40,000 roentgens and greater, all female hookworms were found to be sterile with complete absence of recognisable uterus and ovary and, of course, no ova.

In another experiment, larvae of *A. caninum* were exposed to 30,000 roentgens of X-rays under slightly different physical conditions (i.e. concentration of less than 10,000 uarvae per ml.), and were then inoculated subcutaneously to 5 pups. At necropsy on the 25th day after infection, the female hookworms were recovered and were found to be sterile as above.

Thus, the use of X-irradiated *A. caninum* larvae as vaccine when prepared under the appropriate conditions (i.e. exposed to 30,000 roentgens or greater doses of X-rays) cannot result in the dissemination of hookworm eggs before the time of challenge since all hookworms which may gain the intestines of vaccinated pups before that time are sexually sterile and hookworm eggs are not demonstrable in the feces of the pups.

Experiment 4 (Example 1)

As part of Experiment 2 (Example 1) in which 11 pups in 2 groups were double vaccinated when 3 and 4 months-old by administration of infective larvae of *A. canium* after irradiation with 40,000 roentgens of X-rays, 2 further groups of pups were double vaccinated, one by subcutaneous inoculation and the other orally, but with unirradiated or normal *A. caninum* larvae. The immunities of these 18 pups and of 11 unvaccinated but similar pups in 2 control groups were then challenged when they were 5 months-old by infection with 1,000 normal *A. caninum* larvae; and the efficacy of vaccination was determined by enumerating their challenge worm burdens. Of the 11 pups that were vaccinated with irradiated larvae, 6 received their vaccine and challenge by subcutaneous inoculation, while to the other 5 vaccine and challenge larvae were given orally. Similarly, of the 7 pups that were vaccinated with normal larvae, 3 received their vaccine and challenge by subcutaneous inoculation, while to the other 4 vaccine and challenge larvae were given orally. To the unvaccinated control pups in the remaining 2 groups, 6 were given their challenge larvae by subcutaneous inoculation and 5 orally. The necropsy worm burdens and protection (percent) in vaccinated pups comparing those that received X-irradiated and normal larvae as vaccine (Table 4) showed that vaccination by either the subcutaneous or oral routes with unirradiate *A. caninum* larvae was of inferior efficacy to vaccination by the subcutaneous route with X-irradiated larvae.

TABLE 4

| No. of pups | Vaccination | | | Mean group worm burdens ± standard deviation | Vaccine protection, (percent) |
|---|---|---|---|---|---|
| | Irradiation, r. | Route | Challenge route | | |
| 6 | Control | | Subcutaneous. | 779±96 | 0 |
| 6 | 40,000 | Subcutaneous. | do | 97±59 | 88 |
| 3 | 0 | do | do | 332±197 | 57 |
| 5 | Control | | Oral | 860±123 | 0 |
| 5 | 40,000 | Oral | do | 336±222 | 60 |
| 4 | 0 | do | do | 300±302 | 65 |

Oral vaccination with X-irradiated larvae was as inefficient as were oral and subcutaneous vaccination with normal larvae. Not only was vaccination with unirradiated larvae of inferior efficacy when measured by the resistance to challenge hookworm establishment, but it proved to be extremely hazardous for the health and survival of the pups that were being vaccinated with these larvae. Of the 12 pups that were infected with normal larvae as vaccine, 5 died between the 12th and 24th days after fiirst inoculation as a direct result of the pathogenic activities of the normal hookworms from their vaccine administration. Moreover, during the vaccination procedure using normal larvae, there was a prodigious output of eggs in the feces of the surviving pups that were undergoing vaccination. The use of unirradiated vaccine in pups would thus constitute a considerable risk of contamination of the environment and would serve to spread the infection and disease on a formidable scale. This is in distinct contrast to the use of X-irradiated larvae as vaccine where, as shown in Experiment 3 (Example 1), only sterile female worms reached the intestine and eggs did not appear in the feces of pups before the time of challenge of immunity.

Experiment 5 (Example 1)

Eighteen pups in 3 groups were double vaccinated when 3 and 4 months-old by subcutaneous inoculation of 1,000 larvae of *A. caninum* that had been irradiated with 40,000 roentgens of X-rays. The immunities of these 18 pups and of 14 unvaccinated but similar pups in 3 control groups were then challenged when 5 months-old by infection with 1,000 normal hookworm larvae; and the efficacy of vaccination was determined by enumerating their challenge worm burdens. Six of the vaccinated pups and 6 unvaccinated controls received a subcutaneous challenge inoculation of 1,000 normal *A. caninum* larvae, 6 vaccinates and 5 controls received a subcutaneous challenge of 1,000 normal *Ancylostoma braziliense* larvae, and the remaining 6 vaccinates and 3 unvaccinated controls received a challenge infection of 1,000 normal *Uncinaria stenocephala* larvae by oral administration (only by oral administration of *U. stenocephala* larvae can successful infections be established with this species).

The necropsy worm burdens and protection (percent) in the vaccinated pups (Table 5) show that when given by subcutaneous inoculation, the X-irradiated *A. caninum* vaccine stimulated an immunity in the vaccinated pups which was as successful in protecting these pups against challenge infections of the other two canine hookworm species, *A. braziliense* and *U. stenocephala*.

TABLE 5

| Challenge species | No. of pups | Mean group worm burdens ± standard deviation | Vaccine protection, percent | Challenge control data in unvaccinated pups | |
|---|---|---|---|---|---|
| | | | | No. of pups | Mean group worm burden ± standard deviation |
| A. caninum | 6 | 67±55 | 89 | 6 | 612±266 |
| A. braziliense | 6 | 62±42 | 90 | 5 | 701±69 |
| U. stenocephala | 6 | 146±204 | 78 | 3 | 663±129 |

This finding of interspecific immunity from irradiated *A. caninum* vaccine has not heretofore been shown and is a completely unexpected advantage of this irradiated vaccine. Although monospecific in constitution, the vaccine can thus be described as polyvalent in that it will protect pups against challenge infection by all 3 canine hookworm species.

Experiment 6 (Example 1)

Colostral, formely and incorrectly termed "prenatal," infection of neonatal pups with *A. caninum* is a major problem in the rearing of pups in hookworm-enzootic areas. Whole litters of pups may die within 4 weeks of birth as a consequence of the severe infection which they acquire as third stage infective larvae via the colostrum of their dam. Anthelmintic treatments are completely ineffective against these larvae in the bitch and in her colostrum, and anthelmintic treatment of new-born pups is difficult, hazardous to the health and survival of the pups and is a largely ineffective procedure. Since these larvae may be present in the bitches' milk for up to 12 days after whelping, the only sure method of prevention is to rear the pups artificially in isolation from their dam. At present this is extremely complicated is a dangerous procedure for the health and survival of the pups and is impractical except on an experimental basis. Vaccination of the bitch with X-irradiated *A. caninum* larvae, as described below, has been shown to prevent this type of infection in new-born pups with a high degree of efficacy. At present this is the only safe and effective method of prophylaxis in this situation, while therapeutic methods are ineffectual and hazardous to the pup.

Infective larvae of *A. caninum* were exposed to ionising radiation, for example 40,000 roentgens of X-rays, under similar conditions to those described above (Example 1). The irradiated larvae were then inoculated subcutaneously to immature and adult bitches in a double vaccination schedule before mating and/or during pregnancy. After completion of the vaccination schedule and before whelping, the bitches were given one or more challenge inocula of normal *A. caninum* larvae Similar challenge inocula were also given to unvaccinated bitches at the same time relative to their reproductive cycles to induce colostral infection in the progeny, the worm burdens of which would serve as controls to determine the effect of vaccination of the bitch on the severity of this type of infection.

The necropsy hookworm burdens of *A. caninum* in the pups whelped by the vaccinated bitch that received her challenge infection one week before whelping (Table 6) were significantly reduced (mean of 8 worms per pup, of which 7 were sterile female worms originating from the X-irradiated larvae that had been inoculated as vaccine to the bitch) compared with the worm burdens in the pups whelped by the respective control bitch (59 worms/pup). In the second experiment for which the results are given in Table 6, two inocula of X-irradiated vaccine were given to a bitch pup when she was 3 and 4- months old. During the following period until she was mated and also during the subsequent pregnancy, many challenge inocula of normal larvae were made to the vaccinated bitch and to a similar but unvaccinated control bitch. After whelping, 2 pups in each litter were necropsied and it was found that vaccination of the bitch had been effective in reducing the colostrally-acquired neonatal hookworm infection of her pups, compared with the degree of infection in pups whelped by the unvaccinated bitch. Also as in the first case, more than half of the hookworms in the pups whelped by the vaccinated bitch were sterile females that originated from the vaccine inocula of irradiated larvae.

TABLE 6

| Bitch inoculation, weeks before whelping | | | | Worm burdens in pups (individuals, or mean ± standard deviation) | |
|---|---|---|---|---|---|
| Vaccinated | | Challenge infection | | | |
| 1 | 2 | Time | No. of larvae | No. of pups | Total burdens [1] | Sterile female worms |
| 14 | 9 | 1 | 1,000 | 4 | 8±3 | 7 |
| Control | | 1 | 1,000 | 5 | 59±21 | 0 |
| 38 | 34 | 20-1 | 12,500 | 2 | 25,39 | 14,18 |
| Control | | 24-1 | 12,500 | 2 | 123,137 | 0 |
| 7 | 3 | 8 | 2,000 | 3 | 118±7 | 7 |
| Control | | 8 | 2,000 | 2 | 81,119 | 0 |

[1] Including sterile female worms.

The third experimental result described in Table 6 refers to 2 bitches which were inoculated with normal *A. caninum* larvae immediately after mating to induce colostral infection in their progeny. One of the infected bitches was then vaccinated during pregnancy (i.e. after "challenge" infection) and the worm burdens in 2 and 3 pups of the litters were recovered at necropsy and enumerated. Vaccination with irradiated larvae after challenge with normal larvae was ineffective in reducing or modifying the degree of colostral infection in the pups, thus showing that the effective inhibition of colostral infection in new-born pups was associated in the first 2 experiments with the immune response which followed prophylactic vaccination of the uninfected bitch.

In a further series of experiments, it was shown that this benefit of primary vaccination of uninfected bitches in reducing potentially lethal colostral infection in their new-born pups was effective throughout at least 4 consecutive litters from each bitch, in spite of repeated and large inocula of normal larvae to the vaccinated bitches between and during each of the consecutive pregnancies. This effect of vaccination of the bitch presents a completely novel concept and is a highly efficacious procedure for the prevention of colostral infection in newborn pups, which was until now an almost insoluble problem and a major source of disease and death.

It is also an important advantage that, in the pups whelped by vaccinated bitches, most of the colostrally-acquired hookworms are sterile female hookworms which cannot produce eggs. Thus, contamination of the environment with hookworm ova and auto-reinfection of the pups with hookworm larvae which would develop from ova shed by pups born to unvaccinated bitches is reduced to insignificant levels in pups whelped by vaccinated bitches. This reduction in environmental reinfection facilitates subsequent safe establishment of immunity in the young pup by means of its vaccination with irradiated larvae. (Since these pups are not protected against environmental but only against colostral infection by vaccination of their dams, they must also be vaccinated by the method described elsewhere in this specification.)

EXAMPLE 2

In some of the experiments to attenuate hookworm larvae by exposure to X-rays in doses ranging from 20,00 to 60,000 roentgens and under physical conditions including 10,000 to 50, 000 larvae per ml., and 18 to 22° C. (Example 1), it was noted that the relationship between total X-ray dose and degree of attenuation was non-linear. In some cases and between different experiments, there appeared to be little constancy of radiation dose effect when measured by attenuation. To investigate the physical variables, including total dose of X-rays, in an attempt to define specific conditions for constant attenuation, infective larvae of *A. caninum* were irradiated with X-rays under more exact and specified physical conditions with respect to temperature and to concentration of larvae.

Experiment 1 (Example 2)

Infective larvae of *A. caninum* were irradiated at 20° C. with 40,000 roentgens of X-rays while at various concentrations of from 13,000 to 30,000 per ml. and were then inoculated subcutaneously in doses of 1,000 larvae to pups in 4 groups. At necropsy the worm burdens of these pups were enumerated and the worms examined microscopically. As concentration of larvae during irradiation was increased from 13,000 to 20,000/ ml., the degree of attenuation induced by 40,000 roentgens of X-rays was diminished. Almost 3 times as many sterile female worms were recovered from the intestines of pups inoculated with larvae irradiated with 40,000 roentgens while at a concentration of 20,000 per ml. compared with the worm burdens in pups that had received larvae which were at a concentration of 13,000 per ml. during irradiation.

In another experiment, concentration of larvae during irradiation was constant while the temperature was varied in steps of 5° C. from 15° C. to 30° C. *Ancylostoma caninum* larvae which had been irradiated with 40,000 roentgens of X-rays under different temperature conditions were inoculated subcutaneously to pups in 4 groups. At necropsy of the pups, it was found that with increase in temperature during irradiation from 15 to 30° C., the degree of attenuation had been reduced by a factor in excess of 2, such that pups inoculated with larvae irradiated with 40,000 roentgens of X-rays while at a temperature of 30° C. harboured more than twice as many sterile female worms as did the pups inoculated with larvae irradiated at 15° C.

Thus, total dose of radiation is only one of at least 3 factors which determine the degree of attenuation induced in the vaccine. The two other factors are temperature and concentration of larvae, and by altering these two factors, it is possible to induce variations in degree of attenuation which exceed those induuced by changing the total radiation dose over a wide range (e.g. from 20,000 to 60,000 roentgens).

Experiment 2 (Example 2)

The presence of sterile female worms in the intestine of vaccinated pups after inoculation of irradiated vaccine is not a pre-requisite for the developement of an effective immunity, since immunity is as effective even if these worms are killed and removed by anthelminitic treatment of pups within 24 hours after inoculating vaccine. However, if irradiation is continued to extremes either by increasing total dose of radiation or by altering the physical factors prevailing during irradiation, as detailed above, such that few irradiated worms (e.g. less than 0.5% of larvae inoculated) reach the intestine of the pups during vaccination, then the resultant immunity of pups vaccinated when 1 and 2 months-old was of unsatisfactory efficacy against a challenge of immunity when 3 months-old (Table 7).

TABLE 7

| No. of pups | Vaccine attenuation measured by percent of larvae inoculated recovered as sterile female worms, from— | | Mean vaccine protection percent ± standard deviation |
|---|---|---|---|
| | 1st vaccination | 2nd vaccination | |
| 5 | 0.3 | 0.1 | 35±13 |
| 14 | 0.7 | 6.7 | 71±19 |
| 6 | 17.0 | 36.1 | 28±34 |

By the same method, when the degree of attenuation was reduced by altering the physical constants during irradiation in the appropriate fashion and/or reducing the total X-ray dose such that a relatively large proportion of the larvae gained the intestine as sterile female worms (e.g. more than 15%), immunity in pups vaccinated when 1 and 2 months-old was similarly of unsatisfactory efficacy (Table 7). However, it has been the general finding that, if the attenuation is of such a degree that of the irradiated larvae inoculated 0.5 to 15% reach the intestine as sterile female hookworms, then pups can be safely and effectively vaccinated against challenge of immunity when 8 weeks-old by giving 2 inocula of irradiated larvae when 4 and 7 weeks-old (Table 7).

The upper limitation of 15% of sterile female worms is more important in younger pups since in some experiments in which vaccination was commenced when the pups were 3 months-old, vaccine for which the figures were in excess of 15% induced satisfactory immunity. However, younger pups are less capable of responding satisfactorily to vaccine that has more extreme attenuation parameters. Younger pups are also more susceptible to the greater pathogenesis consequent to vaccination with poorly attenuated vaccine (e.g. more than 15% of sterile female worms from each inocula of irradiated larvae). Therefore, for general usage, the limits of 0.5 to 15% of larvae reaching the intestine as sterile female worms are applicable to the attenuation process.

Although the presence of sterile irradiated worms in the intestine is not necessary as a prerequisite for stimulating maximal immunity (cf. anthelmintic treatment, first sentence, this experiment) since the important immunogenic phase in the life cycle of irradiated larvae is probably preintestinal during lung migration, the presence of sterile female worms in the numbers specified is necessary as an indicator that the degree of attenuation is satisfactory.

Experiment 1 (Example 3)

Infective larvae of *A. caninum* were irradiated with 100,000 roentgens of X-rays under the appropriate physical conditions to induce high attenuation (e.g. 4 to 10% of irradiated larvae reaching the intestine as sterile female worms) and were then used to double vaccinate 10 pups when they were 7 and 10 weeks-old by subcutaneous inoculation of 2500 larvae suspended in 2 ml. of physiologically acceptable saline solution. When 12 weeks-old, the immunities of the 10 vaccinated pups and of 10 similar but unvaccinated controls were challenged by the natural route following liberation of the pups for 10 days in a test environment which was infective in being heavily contaminated with normal larvae of *A. caninum*. Simultaneously, 7 more vaccinated pups and 5 controls were inoculated with normal larvae of *A. caninum* to serve as controls for the immunogenic efficacy of the double vaccination procedure measured against the subcutaneous route of challenge.

The challenge infections were resisted equally whether administered by the natural or subcutaneous routes (Table 8). The natural challenge infection was extremely severe and proved lethal to 7 of the 10 unvaccinated control pups within 20 days of the start of challenge, at which time the 3 surviving control pups were moribund and the experiment was terminated. In contrast, the vaccinated pups were completely unaffected by their challenger infection. This experiment showed that the immunity stimulated by double subcutaneous vaccination with larvae irradiated at 100,000 roentgens of X-rays was adequate to resist a potentially lethal challenge infection and also a challenge administered by the natural route of infection by exposure to larvae in a heavily contaminated environment.

TABLE 8

| No. of pups | Vaccination | Challenge | Mean group worm burdens ± standard deviation | Vaccine protection, percent |
|---|---|---|---|---|
| 10 | Controls | Natural | 3031±643 | 0 |
| 10 | Subcutaneous | do | 271±82 | 91 |
| 7 | Controls | Subcutaneous | ¹ 570±69 | 0 |
| | Subcutaneous | do | ¹ 156±255 | 95 |

¹ Mean worm burdens of 156 and 570 from challenges of 4,000 and 800 larvae were equivalent to 3.9 and 71.3% takes, respectively, hence giving a protection figure for vaccinate worm burdens of 95%.

EXAMPLE 4

Although in the above experiments the source of ionising radiation was an X-ray generator, ionising radiation also includes γ-rays (e.g. from the radio-active isotopes $^{60}$cobalt, $^{137}$caesium), fast neutrons (e.g. from a nuclear reactor) and high energy electrons (e.g. from a linear accelerator or a Van de Graaf machine). The biological activity of these various types of ionising radiation is essentially similar, differences being qualitative and related to the energy and hence penetrating power of the radiation. These forms of radiation are distinctly different, however, from excitatory radiation such as ultra-violet light (see Example 5).

To accommodate the requirements of practical industrial usage of ionising radiation in the attenuation of hook worm larvae for vacine production, it is more convenient to use a higher energy source (e.g. γ-rays) which, unlike X-rays, is not necessarily dependent on electrical supplies and which is available in greater quantities than that which can be emitted from the most powerful medical or industrial X-ray generators. Also, since γ-rays have higher energy values (e.g. more than 1 mev.) than X-rays (0.05 to 0.1 mcv.), a greater bulk of larval suspension can be irradiated since the higher enregy γ-rays penetrate to a much greater distance than do the X-rays. To calibrate γ-rays for attenuating hookworm larvae, the biological effect of γ-rays from $^{60}$cobalt were investigated and compared with X-rays for the attenuation of premigratory infective larvae of canine hookworms (e.g. *A. canium*).

Experiment 1 (Example 4)

Infective larvae of *A. caninum* were cultured, harvested, processed and prepared in all respects similarly to that specified in Examples 1 to 3, except for the irradiation treatment in which the ionising radiation was $\gamma$-rays from $^{60}$cobalt, instead of X-rays. Utilising the above information as a base for comparison and for selection of the optimal degree of attenuation, bulk larvae from the same batch was divided into two aliquots, one of which was attenuated by 100,000 roentgens of X-rays and the other with 100,000 roentgens of $\gamma$-rays, both irradiations being conducted under exactly the same physical constants of larval concentration per ml. and temperature and a radiation dose rate in the range of 650 to 720 roentgens per minute. These X- and $\gamma$-irradiated larvae were then inoculated subcutaneously to pups in two groups, necropsy worm burdens enumerated 8 days later (Table 9) and the attenuation so measured was compared statisically on worm burden figures by Student's "$t$" test.

TABLE 9

| No. of pups | Radiation | Mean group worm burdens ± standard deviation |
|---|---|---|
| 6 | $\gamma$ | 67.2±32.1 |
| 5 | X | 62.0±13 |

There was no significant difference in the attenuation comparing X- and $\gamma$-irradiated larvae ($P>0.7$), thus showing the action of these two ionising radiations in attenuating the larvae of *A. caninum* to be identical. Two further pups were inoculated with the $\gamma$-irradiated larvae and necropsy performed 15 days after irradiation. The female worms recovered from these pups were all sterile, similar to the invariable findings from infections of X-irradiated larvae.

Experiment 2 (Example 4)

The immunogenic potential of X-ray attenuated *A. caninum* larvae has been measured and demonstrated in the several experiments listed above, and the limits of attenuation defined with reference to the percent of irradiated larvae which may develop into sterile female worms for the optimum and safe method of vaccination of young pups. Also, $\gamma$-irradiation has been shown (Experiment 1, Example 4) to induce identical attenuation to X-radiation. The following experiment was designed to determine the minimum immunogenic dose in each subcutaneous inoculum in a double vaccination experiment using suitably attenuated *A. caninum* larvae, and to compare X- and $\gamma$-irradiated similarly attenuated vaccine in this respect.

The degree of X- and $\gamma$-radiation-induced attenuation (100,000 roentgens) of the *A. caninum* larvae which were used as vaccine for both inocula was similar to that shown in the previous experiment (Table 9). With these two batches of vaccine, pups were double vaccinated when 13 and 15 weeks-old by subcutaneous inoculation of from 250 to 5000 $\delta$-irradiated larvae and from 250 to 1000 X-irradiated larvae. When 17 weeks-old, the immunities of these vaccinated pups, and of 7 similar but unvaccinated pups as control, were challenged by inoculation with 1000 normal larvae; and the efficacy of vaccination was determined by enumerating their challenge worm burdens at necropsy performed 2 weeks after challenge inoculation (Table 10).

TABLE 10

| Radiation (100,000 roentgens) | No. irradiated larvae per vaccine inoculum | No. of pups | Mean group worm burdens ± standard deviation | Vaccine protection, percent |
|---|---|---|---|---|
| X | 250 | 5 | 91±21 | 80 |
|  | 500 | 4 | 14±16 | 97 |
|  | 750 | 4 | 23±19 | 95 |
|  | 1,000 | 4 | 23±12 | 95 |
| Unvaccinated challenge controls | | 7 | 490±98 | 0 |
| $\gamma$ | 250 | 5 | 78±49 | 84 |
|  | 500 | 5 | 70±90 | 86 |
|  | 750 | 5 | 15±8 | 97 |
|  | 1,000 | 4 | 61±40 | 88 |
|  | 5,000 | 5 | 29±36 | 94 |

Pups vaccinated with X-ray attenuated *A. caninum* larvae all developed a satisfactory degree of immunity although those given only 250 larvae as vaccine had significantly ($P<0.01$) larger challenge worm burdens than the pups in the other 3 groups that were vaccinated with larger numbers of X-ray attenuated larvae. The minimum immunogenic dose of X-irradiated vaccine was thus in the region of, and probably less than, 250 larvae.

Pups vaccinated with $\gamma$-radiation attenuated *A. caninum* larvae all developed a satisfactory degree of immunity. A minimum immunogenic dose of $\gamma$-irradiated larvae was not clearly indicated from these results (Table 10) since immunities of vaccinated pups given 250 and 5000 irradiated larvae were not significantly different ($P>0.1$). Thus, the minimum immunogenic dose of $\gamma$-irradiated larvae is less than 250 larvae per inoculum.

Adverse hematologic or clinical signs were not observed in vaccinated pups at any time, while unvaccinated controls were severely affected by the challenge infection. There were no significant differences ($P>0.05$) between the challenge worm burdens of pups that were vaccinated with the same doses of X and $\gamma$-irradiated larvae. Thus, X and $\gamma$-irradiated *A. caninum* larvae are similarly immunogenic when used for double subcutaneous vaccination of pups, with minimum immunogenic doses apparently in the region of, or less than 250 larvae per inoculum.

Experiment 1 (Example 5)

The action, physical and biological characteristics of ionising radiation (e.g. X-rays, $\gamma$-rays, fast neutrons and high energy electrons) are essentially similar and they are very different from another type of radiation, namely ultra-violet light. However, in absence of rationale and proof of any basic similarity in the biological action in attenuating parasites, particularly hookworm larvae, it has been claimed that some parasite larvae may be attenuated by exposure to ultra-violet light and that such attenuated larvae may be used to vaccinate the proper host against a challenge of immunity with normal larvae. To investigate the possibility of applying this technique to attenuating hookworm larvae (e.g. *A. caninum*) with ultra-violet light (an excitatory but strictly a non-ionising radiation), the following experiment was conducted.

Infective larvae of *A. caninum* were exposed to ultra-violet light of which over 80% was in the resonance region of 2537 A. The larvae were suspended in water at concentrations of 237 per ml. or 20,00 per ml. and the distance from the U-shaped quartz discharge tube (Hanovia mercury vapour lamp) was 8 cm. The total exposure time in 7 experiments was varied from 2 to 64 seconds. The variously ultra-violet-treated larvae, and untreated larvae as control, were then inoculated subcutaneously to 18 pups in 9 groups and necropsy performed at termination of the experiment on the 18th day after inoculation, or on the earlier death of the pups. Worm burdens were enumerated at necropsy and all female worms recovered from pups which survived 13 days or more after inoculation were examined microscopically to determine fertility/sterility.

Treatment with ultra-violet light failed completely to cause any significant attenuation of the infective larvae of *A. caninum* since the infectivity of ultra-violet-treated larvae was in all cases the same (i.e. not significantly different) as the infectivity of unirradiated larvae. Moreover, this undiminished infectivity of ultra-violet-treated larvae was associated with full retention of the potential pathogenesis of these infections such that 7 out of the 14 pups inoculated with ultra-violet-treated larvae died of severe acute ancylostomiasis before the 14th day after inoculation of larvae, just as did 2 of the 4 pups inoculated with untreated control larvae. Examination of the adult female worms recovered from the 14 pups that were inoculated with ultra-violet-treated larvae and that survived more than 13 days revealed the presence of full genital development in all these worms (i.e. ovary, uterus and fertile ova). Ultra-violet radiation thus failed to cause any attenuation of the larvae of *A. caninum*, did not stop reproductive development of the resulting adult worms, while infections with such treated larvae were as pathogenic as were untreated normal larvae.

Therefore, it can be seen that, the use of ultra-violet-treated and hence unattenuated larvae would be extremely hazardous for the health and survival of pups and would contribute in no small way to the spread of hookworm infection. Moreover, since only half of the pups infected with ultra-violet-treated larvae survived the first inoculation, the administration of a challenge infection to measure any immunity which might have resulted from this procedure would be impossible as would also the administration of a subsequent dose of ultra-violet-treated larvae as a second vaccination.

We claim:

1. An injectable veterinary vaccine suitable for parenteral administration to animals of the family Canidae comprising a physiologically acceptable aqueous vehicle containing premigratory live hookworm larvae of *Ancylostoma caninum* or *Ancylostoma braziliense* artificially attenuated by exposure to ionising radiation to the extent that the larvae are incapable of reproduction.

2. An injectable veterinary vaccine according to claim 1 in which the larvae have been artificially attenuated by exposure to ionising radiation to an extent that at least 0.5% and not more than 15% living but sterile female worms can be recovered from the intestine of an animal which has been inoculated with the vaccine.

3. An injectable veterinary vaccine according to claim 1 in which the larvae have been artificially attenuated by exposure to X-rays.

4. An injectable veterinary vaccine according to claim 1 in which the larvae have been artificially attenuated by exposure to γ-rays.

5. An injectable veterinary vaccine in unit dosage form suitable for parenteral administration to animals of the family Canidae comprising premigratory live hookworm larvae of *Ancylostoma caninum* or *Ancyclostoma braziliense*, artificially attenuated by exposure to ionising radiation to the extent that the larvae are incapable of reproduction, in an amount of from 125 to 5000 larvae per millilitre of a physiologically acceptable aqueous vehicle.

6. An injectable veterinary vaccine in unit dosage form according to claim 5 in which the larvae are present in an amount of from 250 to 5000 larvae in from 0.25 to 2 millilitres of a physiologically acceptable aqueous vehicle.

7. A process for immunising animals of the family Canidae against infection by hookworms which comprises parenterally administering to the animals the vaccine of claim 1.

8. A process for immunising animals of the family Canidae against infection by hookworms which comprises parenterally administering to the animals the vaccine of claim 5.

9. A process for immunising animals of the family Canidae against infection and spread of hookworm parasites which comprises administering to the animal by subcutaneous inoculation a prophylatically effective amount of a vaccine consisting of a physiologically acceptable liquid vehicle containing non-reproductive and substantially non-pathogenic live hookworm larvae of the species *Ancylostoma caninum* or *Ancylostoma braziliense* which have been artificially attenuated by subjecting live larvae of the third larval stage to a sublethal dosage of ionising radiation.

10. A process according to claim 9 in which the ionising radiation is X-ray radiation.

11. A process according to claim 9 in which the ionising radiation is γ-ray radiation.

References Cited

FOREIGN PATENTS 902,760    8/1962    Great Britain.

OTHER REFERENCES

Otto et al.: Vet. Bull. 9, p. 634 (1939).
Kerr: Vet. Bull. 7, p. 611 (1937).
Dow et al.: J. Am. Vet. Med. Assn. 135(8): 407–411, Oct. 15, 1959.
Gould et al.: Am. J. Path. 31: 949–957 (1955).
Levin et al.: J. Parisitology 28: 477–483 (1942).
Waxler: J. Am. Vet. Med. Assn. 99: 481–485 (1941).
Miller: J. Parasitology 50: 735–742 (1964).
Miller: J. Am. Vet. Med. Assn. 146: 41–44 (1964).
Miller: J. Parasitology 51: 200–206 (1965).

SHEP K. ROSE, Primary Examiner

U.S. Cl. X.R.

250—42; 195—1.8